United States Patent [19]

White

[11] 4,308,016
[45] Dec. 29, 1981

[54] EDUCATIONAL TOY, TEACHING DEVICE AND PUZZLE BLOCK COMBINATION

[76] Inventor: Priscilla A. White, 2548 Elmdale Dr., Cincinnati, Ohio 45230

[21] Appl. No.: 108,526

[22] Filed: Dec. 31, 1979

[51] Int. Cl.³ .................. G09B 19/00; A63F 9/12
[52] U.S. Cl. .................. 434/96; 273/157 R; 434/211; 434/403; 46/24
[58] Field of Search .......... 273/157 R; 35/30, 31 G, 35/34, 69, 72; 46/24; 434/98, 188, 207, 208, 96, 187, 211, 403

[56] References Cited

U.S. PATENT DOCUMENTS

| 274,980 | 4/1883 | Scott | 273/157 R UX |
| 3,208,162 | 9/1965 | Wisdom | 434/211 |
| 3,698,122 | 10/1972 | Adams | 35/31 G X |

FOREIGN PATENT DOCUMENTS

| 429509 | 5/1935 | United Kingdom | 46/24 |
| 675678 | 7/1952 | United Kingdom | 273/157 R |
| 1278544 | 6/1972 | United Kingdom | 434/187 |
| 1551507 | 8/1979 | United Kingdom | 273/157 R |

OTHER PUBLICATIONS

Welch Physics and Chemical Digest, Apr. 1955, vol. 5, No. 2, p. 27.

Primary Examiner—Anton O. Oechsle
Attorney, Agent, or Firm—Frost & Jacobs

[57] ABSTRACT

An educational toy, teaching device and puzzle block combination comprising a plurality of sets of blocks of decreasing dimensions so related one to another as to complete an overall design. Preferably these comprise three sets of cubes color coded so that the combination defined by the cubes may be realized by assembling the cubes in a particular order. To this end there are seven cubes of a given dimension, seven cubes of an intermediate dimension and eight cubes of a smaller dimension. The cubes define three horizontal planes of decreasing size and three vertical planes of a first orientation and of decreasing size and three vertical planes of a second orientation and of decreasing size. The cubes are colored so as to define a pair of matching patterns in each of the nine planes so defined. Each cube, therefore, will be colored on anywhere from three to six of its sides. In the preferred arrangement the colored patterns are circles and all exposed sides of the fully assembled cubes are plain.

15 Claims, 3 Drawing Figures

EDUCATIONAL TOY, TEACHING DEVICE AND PUZZLE BLOCK COMBINATION

TECHNICAL FIELD

This invention resides in an educational toy, teaching device and puzzle block combination which is useful in developing a child's perception of volume and proportion. The invention, however, may also serve simply as a toy to be played with by "children" of all ages. Even adults may find the invention to constitute a most interesting puzzle to solve. The invention comprises a number of graphic blocks of varying but related sizes so designed as to define, in proper combination, one or more patterns located in one or more planes.

BACKGROUND ART

Blocks of various kinds have been known for years. These range from simple building blocks to puzzle blocks and blocks used as teaching devices of various sorts. In order to better determine the status of the prior art a preliminary patentability search of the existing U.S. patents was conducted in the U.S. Patent Office. It was the intent of the search to develop those U.S. patents which appeared to come closest to the present invention. The search did indeed develop a number of patents relating to various kinds of blocks and the like but no assertion is made that these patents do in fact represent the closest of such art in spite of the fact that that was the intent of the search. The U.S. Pat. Nos. developed by the search are as follows:

CALKINS, 181,637;
DAVIS, 209,385;
BENNETT, 722,668;
BRAINE, 847,545;
CRITCHETT, 884,902;
RHODES, 1,453,728;
PHILLIPS, 1,869,864;
MARTIN, 3,464,145;
ODLER, 3,608,906;
ZEISCHEGG, 3,659,360;
ESTVAN, 3,759,526;
SECTER, 3,773,329 and
MARC, 4,153,254.

With respect to the foregoing patents, CALKINS illustrates a group of puzzle blocks of various shapes to form certain geometrical designs. DAVIS illustrates a device for teaching mathematical relationships such as square and cube roots; in particular, this latter device uses a large block graduated along the upper edges and provided with a cubical recess at one corner for the purpose of placing therein a corresponding number of smaller cubic blocks that fill up the space cutout. CRITCHETT illustrates a series of puzzle blocks of different sizes utilizing staircase-shaped pieces. MARTIN describes a set of blocks such that one face of each block is used in creating an over-all design formed by all the blocks of the set. ESTVAN discloses game pieces with patterns formed by joining pairs thereof. MARC (and others) describes a three-dimensional puzzle game, this one utilizing polyhedrons of different volumes to form an overall cubical or parallelepiped-like block.

DISCLOSURE OF THE INVENTION

The educational toy, teaching device and puzzle block combination constituting this invention is intended, among other things, to develop a child's perception of volume and proportion. A preferred form of the invention comprises a graphic block made up of a first group of a given number of like blocks each bearing part of a colored pattern, a second group of like but smaller blocks each bearing part of a similar colored pattern, and a third group of like but still smaller blocks each bearing part of a similar colored pattern, all of the blocks being fitted together so that the colored patterns are completed by the proper arrangement of the blocks.

More specifically, the invention comprises a graphic block made up of a first group of seven identically dimensioned cubes each bearing part of three colored patterns, one pattern lying in a horizontal plane, and the other two patterns lying in vertical planes which are at right angles to one another; a second group of seven identically dimensioned cubes each bearing at least one part of three similar colored patterns, the cubes of the second group not only serving to complete the three colored patterns initiated by the first group but also being so colored and arranged as to initiate the formation of three similar but smaller patterns, one again lying in a horizontal plane and the other two lying in vertical planes at right angles to one another, each side of these smaller blocks being one half the edge dimension of the larger block first described; and a third group of eight still smaller identically dimensioned cubes each bearing parts of similar colored patterns so arranged as to complete the three patterns initiated by the second set of seven cubes, the set of eight cubes also defining three similar but smaller colored patterns, one again lying in a horizontal plane and the other two in vertical planes which are at right angles to one another, the edge dimension of each of these eight smallest cubes being one half the edge dimension of the intermediate cubes. All of these cubes are fitted together so that the three set of three each colored patterns are completed. Thus there will be a first set of three differently colored patterns one of which will appear in a horizontal plane and the other two of which will appear in vertical planes which are at right angles to one another; a second set of three differently colored smaller patterns one of which will appear in a horizontal plane and the other two of which will appear in vertical planes which are at right angles to one another; and a third set of three differently colored similar but still smaller patterns one of which will again lie in a horizontal plane and the other two of which will again lie in vertical planes which are at right angles to one another. Preferably the patterns of each set are identical in shape and color, just smaller as the cubes decrease in size.

More particularly, the educational toy, teaching device and puzzle block combination constituting this invention is comprised of twenty-two pieces which preferably form an eight inch cube. There are, therefore, seven cubes each of which is four inches on a side, seven cubes each of which is two inches on a side, and eight one inch cubes. Preferably these cubes are made of wood and each, regardless of size, has three to six painted sides. When the combination is fully assembled, the outside will appear to be entirely the same finish, preferably natural, and when the first corner piece, for example, is taken off or rotated, the color within is revealed.

The pieces are color coded so that the combination may be reassembled in a particular order, and also so that particular patterns may be effected by the placement of the cubes on a flat surface or stacked on top of themselves.

In the preferred embodiment of the invention the colors take the shape of circles so that there is a relationship established between square and circle, and also between cube and sphere, keeping in mind that the intersection of a horizontal plane and two vertical planes which are at right angles to one another and to the horizontal plane will define an imaginary sphere located within the confines of the cube. These graphics, therefore, are an aid to comprehending volumetric relationships, as well as providing an understanding of two dimensional proportion. The inventive combination of cubes thus develops the coordination of hand and eye to use the principles of two and three dimensions simultaneously. It will be readily apparent to those skilled in the art that these graphics also allow for an endless variety of patterns. These may depend on the imagination of the user. Thus the cubes may not only be assembled so as to achieve the particular orientation and repetition of the three sets of three each progressively decreasing pattern sizes but also the cubes may be arranged in other ways to reach different designs.

DETAILED DESCRIPTION OF THE INVENTION

Figure 1:
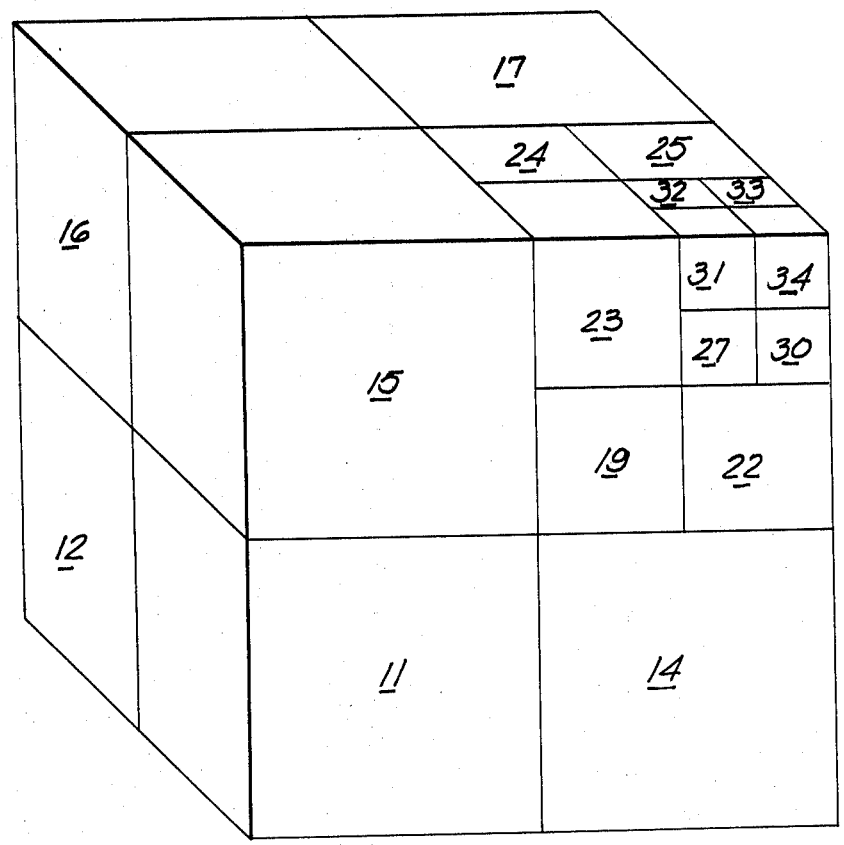
FIG. 1 is a perspective view illustrating the educational toy, teaching device and puzzle block combination of this invention in a preferred, fully assembled arrangement.
Figure 2:
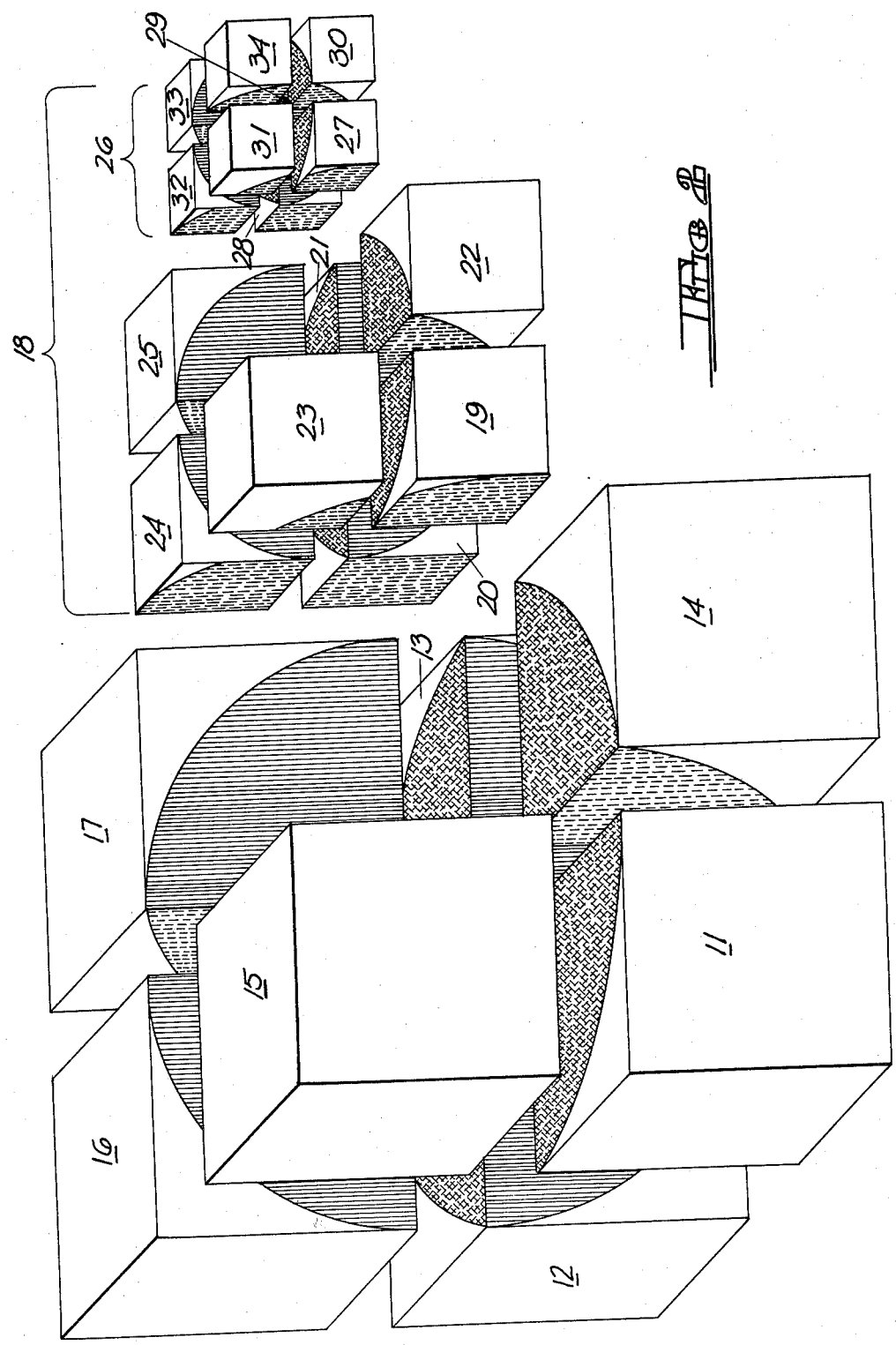
FIG. 2 is an exploded perspective view illustrating the first group of seven identical cubes, the second group of seven identical but smaller cubes and the third group of eight identical but still smaller cubes, the relationship of each group of cubes to the other groups being thus illustrated.

Referring first to FIG. 2 the educational toy, teaching device and puzzle block combination constituting this invention is illustrated as consisting of twenty-two separate cubes. The first seven of these cubes are of the same, relatively large size and are indicated by the reference numerals 11 through 17. The next seven cubes are of the same but smaller size and are indicated by the reference numerals 19 through 25. The eight cubes constituting the third group are of the same but still smaller size and are identified by the reference numerals 27 through 34. When the seven cubes of intermediate size are placed on cube 14 of the first group they occupy the space that would have been taken by an eighth cube of the same size as the cubes 11 through 17 if there were to have been such an eighth cube. These seven intermediate sized cubes leave a space that would have been occupied by an eighth cube of the same size as these intermediate cubes 19 through 25 had there been such an eighth intermediate cube. This last mentioned space appears above the cube 22 and the eight smallest sized cubes are placed on this intermediate sized cube 22 so as to complete the basic cube defined by all 22 of these three different sized cubes. This basic cube is depicted in FIG. 1 wherein the various cubes, where visible, are identified by like reference numerals.

Figure 3:
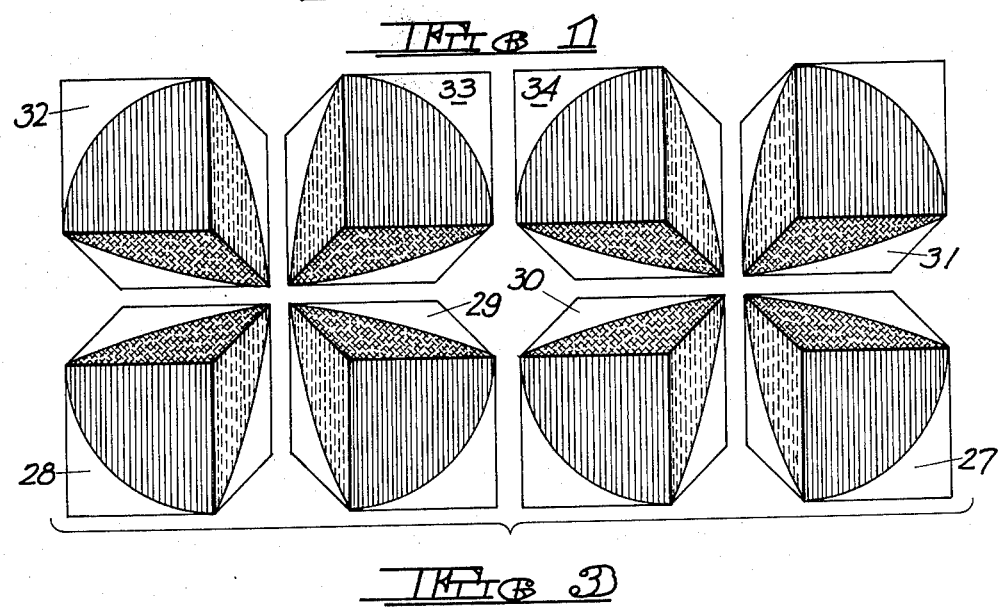
FIG. 3 is an exploded perspective view of the eight identical smallest cubes.

It will be observed that FIG. 3 depicts the smallest sized, eight cubes as they appear when the front four of such cubes, as viewed in FIGS. 1 and 2, are swung around from left to right as also viewed in these figures so as to be disposed in line with the back four of such cubes.

It will be apparent that the various cubes may be assembled in the manner depicted in FIG. 2 so as to arrive at the final shape illustrated in FIG. 1. Thus the collection of cubes generally indicated at 18 and comprised of the seven intermediate cubes 19 through 25 and the collection of cubes generally indicated at 26 and comprised of the eight smallest cubes 27 through 34 will all occupy the space above the large cube 14. For one to start with all twenty-two of the cubes illustrated by initially randomly arranged and to build them into the finished condition illustrated in FIG. 1 may be of some interest and may require a modicum of skill. In the preferred form of the invention, however, the cubes are provided with colored patterns so that it is necessary to arrange each cube in a particular place in order to achieve a proper final result.

In the preferred form of the invention as illustrated in FIGS. 1 through 3 the patterns for each of the various groups of blocks are located in three planes, one being horizontal and the other two being vertical and at right angles to one another so that each of the vertical planes bisects the horizontal plane. Each of the patterns illustrated constitutes a colored circle. The colors illustrated are orange, red and purple. The orange circle appears in a horizontal plane while the red and purple circles appear in the two vertical planes. Each plane is comprised of mating circles of the same size and color. Thus, for example, considering first the orange circles appearing in the horizontal plane defined by the cubes 11 through 17 and the four intermediate sized cubes 19 through 22, it will be observed that the upper surfaces of the four lowermost large cubes 11 through 14 will bear portions of the largest orange circle while the lowermost sides of the upper cubes 15 through 17, and the lowermost sides of the four cubes 19 through 22, will all be colored so as to form, together, an orange circle which will correspond to and mate with the large orange circle defined by the colored upper surfaces of the four large cubes 11 through 14.

The vertical patterns are also illustrated as being colored circles. In the arrangement illustrated, those sides of the cubes 11, 12, 16 and 15 which face corresponding sides of the cubes 14, 13 and 17, and the corresponding sides of the four smaller cubes 19, 20, 24 and 23, are all colored to define a pair of purple circles which match one another. Similarly those sides of the cubes 12, 15, 17 and 13 which face corresponding sides of the cubes 14, 11 and 15 along with the corresponding sides of the four intermediate cubes 20, 24, 25 and 21, define a pair of mating red circles. In the arrangement so far described, therefore, the various cubes are painted so as to form a pair of large orange circles which abut one another in a horizontal plane, a pair of large purple circles which abut one another in a first vertical plane, and a pair of large red circles which abut one another in a second vertical plane.

It is contemplated that the arrangement of three colored patterns, circles as described herein, will be repeated, on successively smaller scales, for each of the other groups comprised of the intermediate cubes and of the smallest sized cubes. The upper faces of the cubes 19, 20, 21 and 22, and the lower sides of the cubes 23, 24 and 25 along with the lower sides of the four smallest cubes 27, 28, 29 and 30 will define a pair of adjacent, mating orange circles of a size somewhat smaller than that first described. Similarly the sides of the cubes 19, 20, 24 and 23 which face the corresponding sides of the cubes 22, 21 and 25 along with the corresponding sides of the cubes 27, 28, 32 and 31 will define a pair of corresponding, mating purple circles somewhat smaller than those first described. And the sides of the cubes 20, 24, 25 and 21 which face corresponding sides of the cubes 22, 19 and 23 along with the corresponding sides of the cubes 28, 32, 33 and 29 will define a pair of corresponding, mating red circles somewhat smaller than those first described.

The graphics are repeated in the third group comprised of the eight smallest cubes 27 through 34. Thus these cubes will be colored so as to define, when properly assembled, within themselves, a pair of corresponding, mating orange circles, horizontally disposed, smaller than the orange circles previously mentioned, while also defining a pair of corresponding, mating purple circles in a vertical plane and another pair of corresponding, mating, red circles in a different vertical plane.

From the foregoing it will be observed that each cube will have anywhere from three to six of its sides colored. Cube 11, for example, will be colored on only three sides, namely, a quadrant of the orange circle will be painted on the upper surface, a quadrant of a large purple circle will be on that side which faces the cube 14 and the quadrant of the large red circle will be on that side which faces the cube 12. By the same token cube 20 will be colored on all six of its sides. The lower side of this cube will be colored orange to form a part of the largest orange circle while the upper side of cube 20 will be colored orange to form a quadrant of an orange circle of intermediate size. That side of the cube 20 which faces the cube 17 will be colored red in order to form a part of one of the largest red circles while the corresponding opposite side of the cube 20 will be painted red in part so as to form a quadrant of one of the red vertically disposed circles of intermediate size. In similar fashion that side of the cube 20 which faces the cube 15 will be colored purple so as to form a part of one of the largest purple vertical circles while the corresponding opposite side of such cube 20 will have a portion thereof colored purple in order to form a quadrant of one of the purple vertically disposed circles of intermediate size.

From the foregoing, therefore, it will be apparent that the various cubes are in effect color coded so that the educational toy, teaching device and puzzle block combination may be assembled in a particular order. It is contemplated that the exterior sides of all of those cubes which define the total cube of FIG. 1 will be of the same color such as a natural finish and the like. The colors defining the patterns will be in contrast to this. It is also possible, however, to arrange the various cubes so as to form designs other than that illustrated in FIG. 1. Particular patterns may be achieved from these same blocks by arranging them on a flat surface or by stacking them on top of themselves. In that form of the invention which has been found quite suitable for use by children of age four and up, the dimensions are of some importance. The largest cubes of four inches on a side are still capable of being handled by such a youngster. This necessitates, in the form of the invention illustrated, the smallest cube having a one inch dimension on a side and this is important because such a cube is large enough that it cannot be taken into the child's mouth. If the smallest cubes are made much larger than one inch on a side the corresponding intermediate cubes and particularly the largest cubes will be too large for a child to handle although such a combination may well be satisfactory for adults. The colors designated herein are a deviation from the expected and prevalent use of the primary colors (yellow, red, and blue). Orange and purple are bright colors, as are the primaries, but both being warm colors, give a child the opportunity to experience a different range of the color wheel (orange and purple both relating to red, a primary, by the addition of the other two primary colors to the pigment red: red + yellow make orange; red + blue make purple). The relatedness of these colors gives another level of unity to the scope of the patterns within the cube.

The cubes have been illustrated with colored patterns. The particular graphics so illustrated are the various circles of orange, red and purple. These patterns repeat themselves in that there is a first set of six relatively large colored circles comprised of two mating-, horizontal orange circles, two mating, vertical purple circles bisecting the horizontal circles and a pair of mating, vertical red circles also bisecting the orange circles and being disposed at right angles to the purple circles. In the novel combination illustrated herein these same graphics are repeated in the same orientation on an intermediate scale and on a still smaller scale. The use of these particular graphics are a positive aid for childern in comprehending volumetric relationships; they also provide an understanding of two dimensional proportion. The combination develops the coordination of hand and eye to use these principles of two and three dimensions simultaneously. At the same time these particular graphics may be used as building blocks apart from the arrangement depicited in FIG. 1 and permit a wide variety of patterns as imagined and designed by the user.

From the foregoing, therefore, it will be apparent that the invention depicted in the drawings and described above comprises a graphic block puzzle made up of a first group of seven identically dimensioned cubical blocks each bearing part of three colored circular patterns, a second group of seven identically dimensioned cubical blocks each bearing a part of three similar but smaller circular colored patterns and some of these intermediate seven also bearing a part of one or more of the larger patterns, each side of these intermediate sized blocks comprising the second group being one half the edge dimension of the large blocks comprising the first group, and a third group of eight smaller identically dimensioned cubical blocks each bearing a part of three similar but still smaller circular colored patterns and some of these smallest eight also bearing a part of one or more of the intermediate patterns, the edge dimension of each of these smallest blocks being one-half the edge dimension of the intermediate blocks. The blocks are fitted together so that the colored circular patterns repeat and are completed by the proper arrangement of the blocks.

More broadly speaking the educational toy, teaching device and puzzle block combination of this invention includes provision of three sets of blocks of decreasing dimension arranged to complete an overall design.

It will be apparent to those skilled in the art that modifications may be made in this invention without departing from the scope and spirits thereof. The preferred embodiment depicted in FIGS. 1 through 3 is particularly well suited for acquainting children with the relationship between squares and circles and between cubes and spheres. Other geometrical designs, both in shape and in pattern, may be employed. Other patterns may be used in place of the circles illustrated and could comprise indicia of all sorts. Other colors may be employed although those selected have been found to be most attractive to children. Other sizes may be utilized as well, although sizes in the range indicated are very well suited for use by children. As noted, however, the invention is suitable for persons of all ages. It is to be understood, therefore, that the invention is not limited to these shapes, patterns, colors, sizes and the like except insofar as they may be specifically set forth in certain of the subjoined claims directed to the preferred embodiment.

It will also be apparent to those skilled in the art that the arrangement of the cubes illustrated, for example, may be changed. It is possible, by way of further example, to provide an intermediate block 26A (not shown) in the space above cube 22 and to color it so as to complete the various circular patterns and to then replace the cube 20 with the set of eight cubes 27 through 34, again making the necessary changes in the colored patterns so that these blocks will take the place of the removed cube 20 in all respects. By thus "burying" the group of eight cubes 27 through 34, the difficulty level in working the puzzle may be increased. Similar switches and substitutions are possible.

Furthermore it will be apparent that the novel combination of this invention could be simplified such as by, for example, eliminating the third group of eight small cubes and simply using the first group of seven large cubes in combination with a second group which would now be comprised of eight smaller cubes rather than the seven illustrated. And although wood has been found to be a very satisfactory substance out of which the geometrical shapes of this invention may be formed, it will be readily apparent to those skilled in the art that other materials such as plastic and the like may be utilized. Patterns may also be applied to the exterior sides of those particular cubes which are exposed when the assemblage of cubes is oriented in the manner depicted in FIG. 1 although it is preferred that these sides be plain as indicated.

All of these modifications, and others which may become apparent to those skilled in the art after exposure to these teachings, are within the scope and spirit of this invention. In this regard it is to be particularly noted that while the invention has been described in connection with particular graphics, structures, patterns, and arrangements, the invention is not to be limited to these particular graphics, patterns, structures and arrangements except insofar as they are specifically set forth in the subjoined claims.

What I claim is:

1. An educational toy, teaching device and puzzle block combination comprised of three sets of blocks which may be oriented so as to form an overall shape, the combination being comprised as follows: a first set of seven identically shaped, relatively large size blocks; a second set of seven identically shaped, intermediate size blocks, the second set of blocks occupying, when assembled, seven-eighths the volume occupied by a single one of the relatively large size blocks; and a third set of eight identically shaped, relatively small size blocks, the third set of blocks occupying, when assembled, a volume equal to the volume occupied by a single one of the intermediate size blocks; all twenty-two of the said blocks, when assembled, forming said overall shape.

2. The combination of claim 1 in which each of the twenty-two blocks comprises a graphic cube, the said graphic cubes defining, within the said overall shape, three pairs of horizontal abutting patterns, three pairs of first vertical abutting patterns, and three pairs of second vertical abutting patterns, each pair of first vertical abutting patterns bisecting one pair of the three pairs of said horizontal abutting patterns, and each pair of said second vertical abutting patterns bisecting one of the three pairs of said horizontal abutting patterns and being disposed at right angles to one pair of the three pairs of said first vertical abutting patterns.

3. The combination of claim 2 in which all of those exterior sides of the said graphic cubes which are exposed, when all twenty-two of the said graphic cubes are assembled to form said overall shape, define a certain pattern.

4. The combination of claim 2 in which each pair of the three pairs of said horizontal abutting patterns is comprised of two colored circles, each pair of the three pairs of said first vertical abutting patterns is comprised of two colored circles, and each pair of the three pairs of said second vertical abutting patterns is comprised of two colored circles.

5. The combination of claim 4 in which all six of the horizontal circles are of a first color, all six of the first vertical circles are of a second color, and all six of the second vertical circles are of a third color.

6. The combination of claim 5 in which those sides of the various graphic cubes which are exposed when all of the said twenty-two graphic cubes are assembled to form said overall shape are of a fourth color.

7. The combination of claim 5 in which each of the seven graphic cubes of relatively large size is about four inches on a side, each of the seven graphic cubes of intermediate size is about two inches on a side, and each of the eight graphic cubes of smallest size is about one inch on a side, whereby said overall shape comprises about an eight inch cube.

8. The combination of claim 7 in which the three colors are orange, red and purple.

9. The combination of claim 8 in which those sides of the various graphic cubes which are exposed when all of the said twenty-two graphic cubes are assembled to form said overall shape are of a fourth color.

10. An educational toy, teaching device and puzzle block combination comprised of three sets of graphic cubes of decreasing dimensions to complete an overall design comprising a basic cube; said graphic cubes defining horizontal and vertical patterns within said basic cube; and there being a first set of seven graphic cubes of a first dimension on edge, a second set of seven graphic cubes having an edge dimension which is one-half of said first dimension, and a third set of eight graphic cubes having an edge dimension which is one-fourth of said first dimension.

11. The combination of claim 10 in which: the tops of four of said cubes of said first set define a first horizontal pattern, the bottoms of the other three cubes of said first set together with the bottoms of four of said cubes of said second set defining a mating and abutting first horizontal pattern; vertical faces of four of the said cubes of said first set define a first vertical pattern, corresponding vertical faces of the other three cubes of said first set together with vertical faces of four of said cubes of said second set defining a mating and abuting first vertical pattern; additional vertical faces of four of the said cubes of said first set define an additional vertical pattern, corresponding additional vertical faces of the other three cubes of said first set together with additional vertical faces of four of said cubes of said second set defining a mating and abutting additional vertical pattern, said first vertical pattern and its mating and abutting first vertical pattern, and said additional vertical pattern and its mating and abutting additional vertical pattern, being at right angles to one another, each bisecting said first horizontal pattern and its said mating and abutting first horizontal pattern; the tops of four of said cubes of said second set define a second horizontal pattern, the bottoms of the other three cubes of said second set together with the bottoms of four of said cubes of said third set defining a mating and abutting second horizontal pattern; vertical faces of four of the said cubes of said second set define a second vertical pattern, corresponding vertical faces of the other three cubes of said second set together with vertical faces of four of said cubes of said third set defining a mating and abutting second vertical pattern; additional vertical faces of four of the said cubes of said second set define another vertical pattern, corresponding additional vertical faces of the other three cubes of said second set together with additional vertical faces of four of said cubes of said third set defining a mating and abutting another vertical pattern, said second vertical pattern and its mating and abutting second vertical pattern, and said another vertical pattern and its mating and abutting another vertical pattern, being at right angles to one another, each bisecting said second horizontal pattern and its mating and abutting second horizontal pattern; the tops of four of said cubes of said third set define a third horizontal pattern, the bottoms of the other four cubes of said third set defining a mating and abutting third horizontal pattern; vertical faces of four of the said cubes of said third set define a third vertical pattern, corresponding vertical faces of the other four cubes of said third set defining a mating and abutting third vertical pattern; additional vertical faces of four of the said cubes of said third set define a further vertical pattern, corresponding additional vertical faces of the other four cubes of said third set defining a mating and abutting further vertical pattern, said third vertical pattern and its mating and abutting third vertical pattern, and said further vertical pattern and its mating and abutting further vertical pattern, being at right angles to one another, each bisecting said third horizontal pattern and its mating and abutting third horizontal pattern.

12. The combination of claim 11 in which all six of the horizontal patterns are alike, differing only in size, there being three pairs of patterns, each pair of a different size; six of those vertical patterns which parallel one another are alike, differing only in size, there being three pairs of patterns, each pair of a different size; and the other six vertical patterns which also parallel one another are alike, differing only in size, there being three pairs of patterns, each pair of a different size.

13. The combination of claim 12 in which all eighteen patterns are colored circles, each of said twenty-two cubes having a part at least of three differently colored circles thereon, said six horizontal patterns comprising six circles of a first color, the first mentioned six vertical patterns comprising six circles of a second color, and the second mentioned six vertical patterns comprising six circles of a third color.

14. The combination of claim 13 in which those faces of the various cubes which are exposed when the twenty-two cubes are assembled to form said basic cube are of a fourth color.

15. The combination of claim 14 in which said first dimension is about four inches.

* * * * *